(12) United States Patent
Miyazawa

(10) Patent No.: US 8,681,097 B2
(45) Date of Patent: Mar. 25, 2014

(54) REPRODUCING DEVICE, SETTING CHANGING METHOD, AND SETTING CHANGING DEVICE

(75) Inventor: Masaaki Miyazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/461,445

(22) Filed: May 1, 2012

(65) Prior Publication Data

US 2012/0212511 A1 Aug. 23, 2012

Related U.S. Application Data

(62) Division of application No. 11/396,598, filed on Apr. 4, 2006, now Pat. No. 8,194,033.

(30) Foreign Application Priority Data

Apr. 6, 2005 (JP) ................................. 2005-110134
Mar. 2, 2006 (JP) ................................. 2006-057004

(51) Int. Cl.
*G09G 5/00* (2006.01)

(52) U.S. Cl.
USPC ............ 345/156; 345/158; 345/659; 715/788

(58) Field of Classification Search
USPC ......... 345/156, 157, 158, 659, 168, 172, 173, 345/211; 399/81; 715/701, 702, 788, 796, 715/798, 799, 818–820, 828, 829
See application file for complete search history.

(56) References Cited

U.S. PATENT DOCUMENTS

| | | | |
|---|---|---|---|
| 5,642,185 A * | 6/1997 | Altrieth et al. ................. | 399/81 |
| 5,661,632 A | 8/1997 | Register | |
| 5,910,882 A | 6/1999 | Burrell | |
| 6,046,877 A * | 4/2000 | Kelsic ............................. | 360/75 |
| 6,254,513 B1 | 7/2001 | Takenaka et al. | |
| 6,330,149 B1 | 12/2001 | Burrell | |
| 6,538,636 B1 | 3/2003 | Harrison | |
| 6,567,101 B1 | 5/2003 | Thomas | |
| 2002/0021278 A1* | 2/2002 | Hinckley et al. .............. | 345/156 |
| 2002/0099956 A1* | 7/2002 | Suzuki .......................... | 713/200 |

(Continued)

FOREIGN PATENT DOCUMENTS

JP 6-259424 9/1994
JP 6-290574 10/1994

(Continued)

OTHER PUBLICATIONS

Notification of Reasons for Refusal issued by Japanese Patent Office on Dec. 7, 2010, in the counterpart Japanese Patent Application No. 2006-102349.

(Continued)

*Primary Examiner* — Koosha Sharifi-Tafreshi
(74) *Attorney, Agent, or Firm* — Finnegan Henderson Farbow Garrett & Dunner LLP

(57) ABSTRACT

A reproducing device that can reproduce data and operates on a battery includes displaying means, attitude detecting means for detecting an attitude of the reproducing device, determining means for determining whether the reproducing device satisfies a predetermined condition, and controlling means for changing a setting of the reproducing device on a basis of a result of detection of the attitude detecting means when the determining means determines that the reproducing device satisfies the predetermined condition.

13 Claims, 13 Drawing Sheets

(56) References Cited

U.S. PATENT DOCUMENTS

| | | | |
|---|---|---|---|
| 2002/0113578 A1* | 8/2002 | Hansmann et al. | 320/162 |
| 2003/0043278 A1* | 3/2003 | Ushiro | 348/207.99 |
| 2003/0044000 A1 | 3/2003 | Kfoury et al. | |
| 2003/0073462 A1 | 4/2003 | Zatloukal et al. | |
| 2003/0085870 A1* | 5/2003 | Hinckley | 345/156 |
| 2004/0066949 A1 | 4/2004 | Iwasa et al. | |
| 2004/0239792 A1* | 12/2004 | Shibutani et al. | 348/333.12 |
| 2005/0090288 A1* | 4/2005 | Stohr et al. | 455/566 |
| 2005/0143124 A1* | 6/2005 | Kennedy et al. | 455/556.1 |

FOREIGN PATENT DOCUMENTS

| | | |
|---|---|---|
| JP | 08-129557 | 5/1996 |
| JP | 09-266555 | 7/1997 |
| JP | 11-196397 | 7/1999 |
| JP | 2000-059474 | 2/2000 |
| JP | 00-122635 | 4/2000 |
| JP | 2001-134585 | 5/2001 |
| JP | 02-232549 | 8/2002 |
| JP | 2002-232549 | 8/2002 |
| JP | 2002-328658 | 11/2002 |
| JP | 03-162277 | 6/2003 |
| JP | 2003-162277 | 6/2003 |
| JP | 2003-271284 | 9/2003 |
| JP | 04-184659 | 7/2004 |
| JP | 2004-184659 | 7/2004 |
| JP | 04-226715 | 8/2004 |
| JP | 2004-226715 | 8/2004 |
| JP | 05-033319 | 3/2005 |
| JP | 2005-072734 | 3/2005 |

OTHER PUBLICATIONS

Yagawa et al. "TV Program Planning Agent using Analysis Method of User's Taste," *Technical Report of IEICE*, vol. 98, No. 437, pp. 9-16, Dec. 1, 1998.

Notification of Reasons for Refusal, issued by Japanese Patent Office, dated Nov. 15, 2011, in Japanese Patent Application No. 2006-057004 (4 pages).

Notice of Reasons for Rejection, issued by Japanese Patent Office, mailed Oct. 2, 2012, in Japanese Patent App. No. 2006-057004 (3 pages).

Office Action from the Japanese Patent Office in corresponding Japanese Application, dated Sep. 17, 2013 (5 pages).

Court Hearing for Japanese 2006 Patent Application No. 57004, dated Oct. 15, 2013 (5 pages).

* cited by examiner

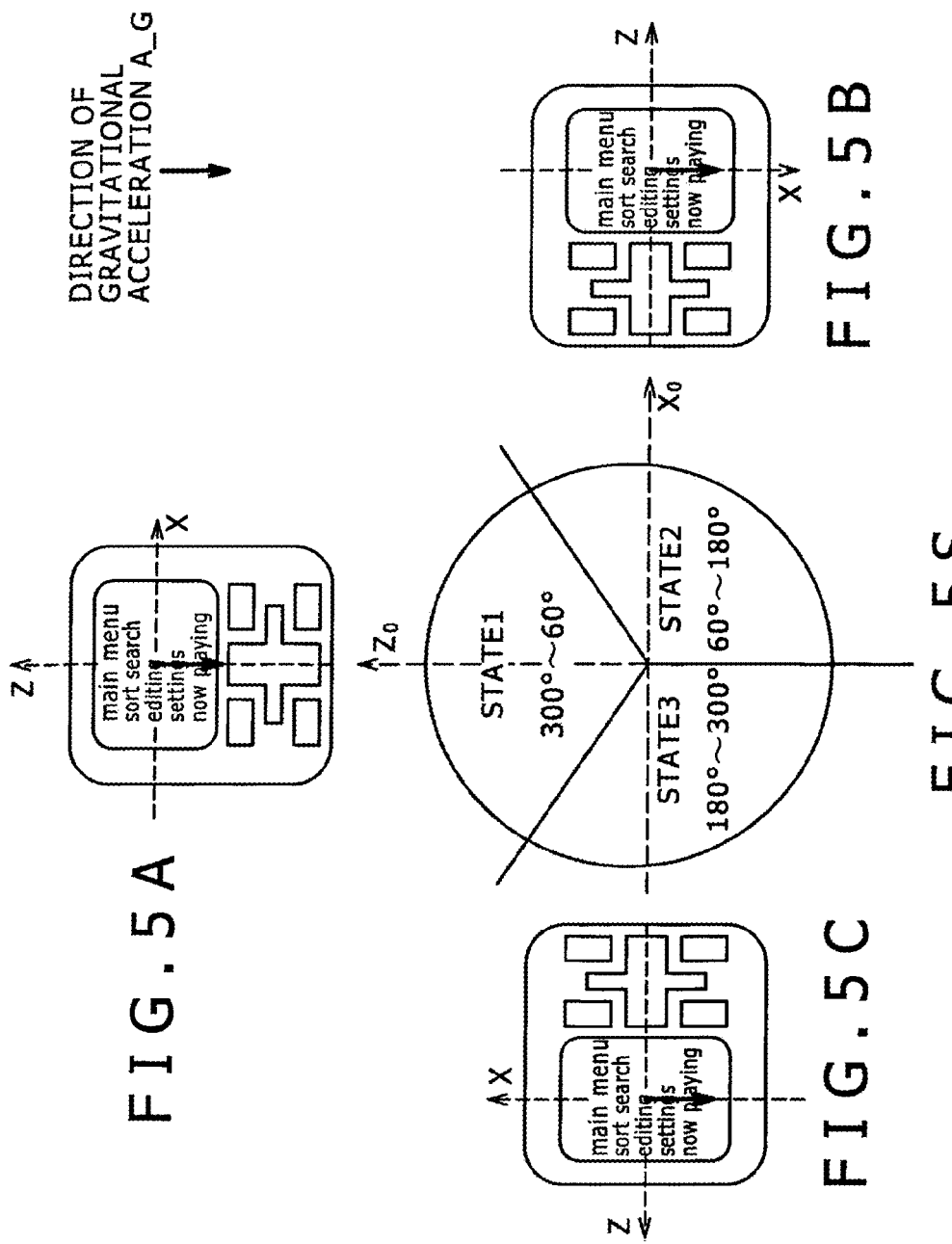

FIG. 7A

STATE1

| OPERATING KEY | DEFINITION |
|---|---|
| K11 | MOVE UPWARD |
| K12 | MOVE TO HIGHER LEVEL |
| K13 | MOVE DOWNWARD |
| K14 | MOVE TO LOWER LEVEL |

FIG. 7B

STATE2

| OPERATING KEY | DEFINITION |
|---|---|
| K11 | MOVE TO HIGHER LEVEL |
| K12 | MOVE DOWNWARD |
| K13 | MOVE TO LOWER LEVEL |
| K14 | MOVE UPWARD |

FIG. 7C

STATE3

| OPERATING KEY | DEFINITION |
|---|---|
| K11 | MOVE TO LOWER LEVEL |
| K12 | MOVE UPWARD |
| K13 | MOVE TO HIGHER LEVEL |
| K14 | MOVE DOWNWARD |

REPRODUCING DEVICE, SETTING CHANGING METHOD, AND SETTING CHANGING DEVICE

CROSS REFERENCES TO RELATED APPLICATIONS

This is a division of application Ser. No. 11/396,598, filed Apr. 4, 2006 now U.S. Pat. No. 8,194,033, based upon and claims priority of Japanese Patent Application P2005-110134 filed with the Japanese Patent Office on Apr. 6, 2005 and Japanese Patent Application P2006-057004 filed with the Japanese Patent Office on Mar. 2, 2006, the entire contents of all of which are incorporated herein by reference.

BACKGROUND OF THE INVENTION

The present invention relates to a method of changing a setting of a data reproducing device that operates on a battery, and a setting changing device that operates on a battery.

Of portable type reproducing devices such as portable telephones and personal digital assistants (PDAs), for example, there is a reproducing device that detects the attitude of the reproducing device and automatically changes the orientation of an image displayed on a display according to the detected attitude.

The orientation of the image displayed on the display is changed by rewriting image data of the image displayed on the display which data is stored in a display memory.

The above-described portable type reproducing device changes the orientation of the image displayed on the display at all times.

However, since the above-described conventional portable type reproducing device changes the orientation of the image according to change in the attitude of the device at all times, display memory rewriting operation involved in changing the orientation of the image can occur frequently, thus increasing power consumption.

In order to solve the problem of the above-described conventional art, it is desirable to provide a reproducing device, a screen controlling method, a program, and a recording medium that can change the orientation of an image according to the attitude of the reproducing device, and reduce power consumption as compared with the conventional device.

SUMMARY OF THE INVENTION

A reproducing device that can reproduce data and operates on a battery includes: displaying means; attitude detecting means for detecting an attitude of the reproducing device; determining means for determining whether the reproducing device satisfies a predetermined condition; and controlling means for changing a setting of the reproducing device on a basis of a result of detection of the attitude detecting means when the determining means determines that the reproducing device satisfies the predetermined condition.

BRIEF DESCRIPTION OF THE DRAWINGS

FIG. 5S is a diagram showing absolute coordinates with reference to a direction of gravitational acceleration and an $X_0$ axis and a $Z_0$ axis of the absolute coordinates;

FIG. 5A is a diagram showing STATE 1 as a state in which the X axis of the relative coordinates of the portable type audio player 1 shown in FIG. 1 intersects the $X_0$ axis of the absolute coordinates with reference to the direction of gravitational acceleration at an angle of −60° to +60°;

FIG. 5B is a diagram showing STATE 2 as a state in which the X axis of the relative coordinates of the portable type audio player 1 shown in FIG. 1 intersects the $X_0$ axis of the absolute coordinates with reference to the direction of gravitational acceleration at an angle of +60° to +180°;

FIG. 5C is a diagram showing STATE 3 as a state in which the X axis of the relative coordinates of the portable type audio player 1 shown in FIG. 1 intersects the $X_0$ axis of the absolute coordinates with reference to the direction of gravitational acceleration at an angle of +180° to +300°;

FIG. 7A is a diagram of assistance in explaining definitions assigned to a cross key when the attitude of the portable type audio player shown in FIG. 1 is STATE 1;

FIG. 7B is a diagram of assistance in explaining the definitions assigned to the cross key when the attitude of the portable type audio player shown in FIG. 1 is STATE 2;

FIG. 7C is a diagram of assistance in explaining the definitions assigned to the cross key when the attitude of the portable type audio player shown in FIG. 1 is STATE 3;

DETAILED DESCRIPTION OF THE PREFERRED EMBODIMENTS

Portable type audio players according to embodiments of the present invention will hereinafter be described.

First Embodiment

Correspondences between constituent elements of a first embodiment and constituent elements of the present invention will first be described.

Figure 1:
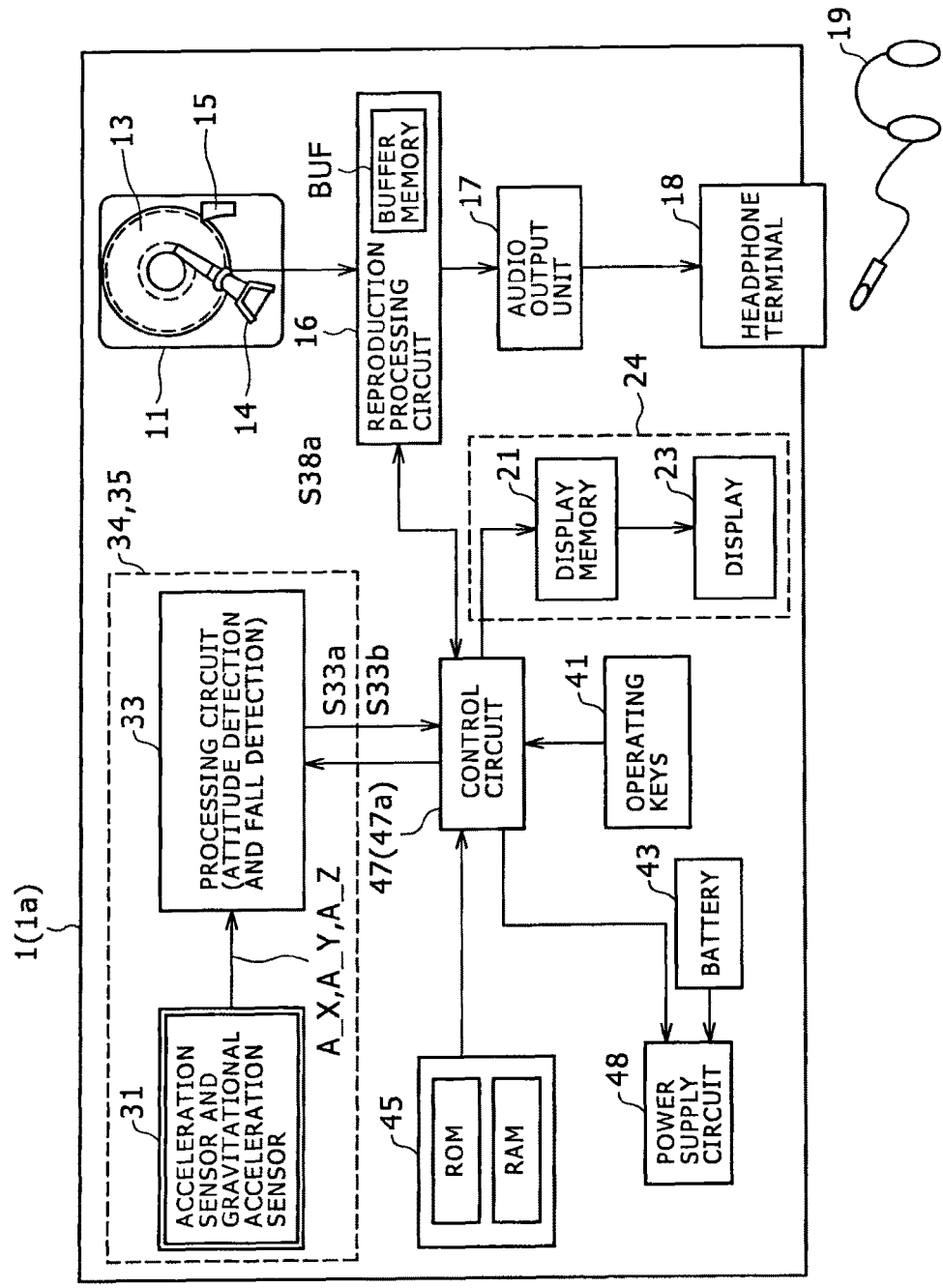
FIG. 1 is a diagram of general configuration of a portable type audio player according to an embodiment of the present invention.

A display 23 shown in FIG. 1 is a display of the present invention.

A processing circuit 33 shown in FIG. 1 is attitude detecting means of the present invention.

A control circuit 47 shown in FIG. 1 is control means of the present invention.

Operating keys 41 shown in FIG. 1 is operating means of the present invention.

A program RPG shown in FIG. 1 is a program of the present invention.

A memory 45 shown in FIG. 1 is a recording medium of the present invention. A recording medium of the present invention is a semiconductor memory, an optical disk, a magneto-optical disk, a magnetic disk or the like.

Figure 8:
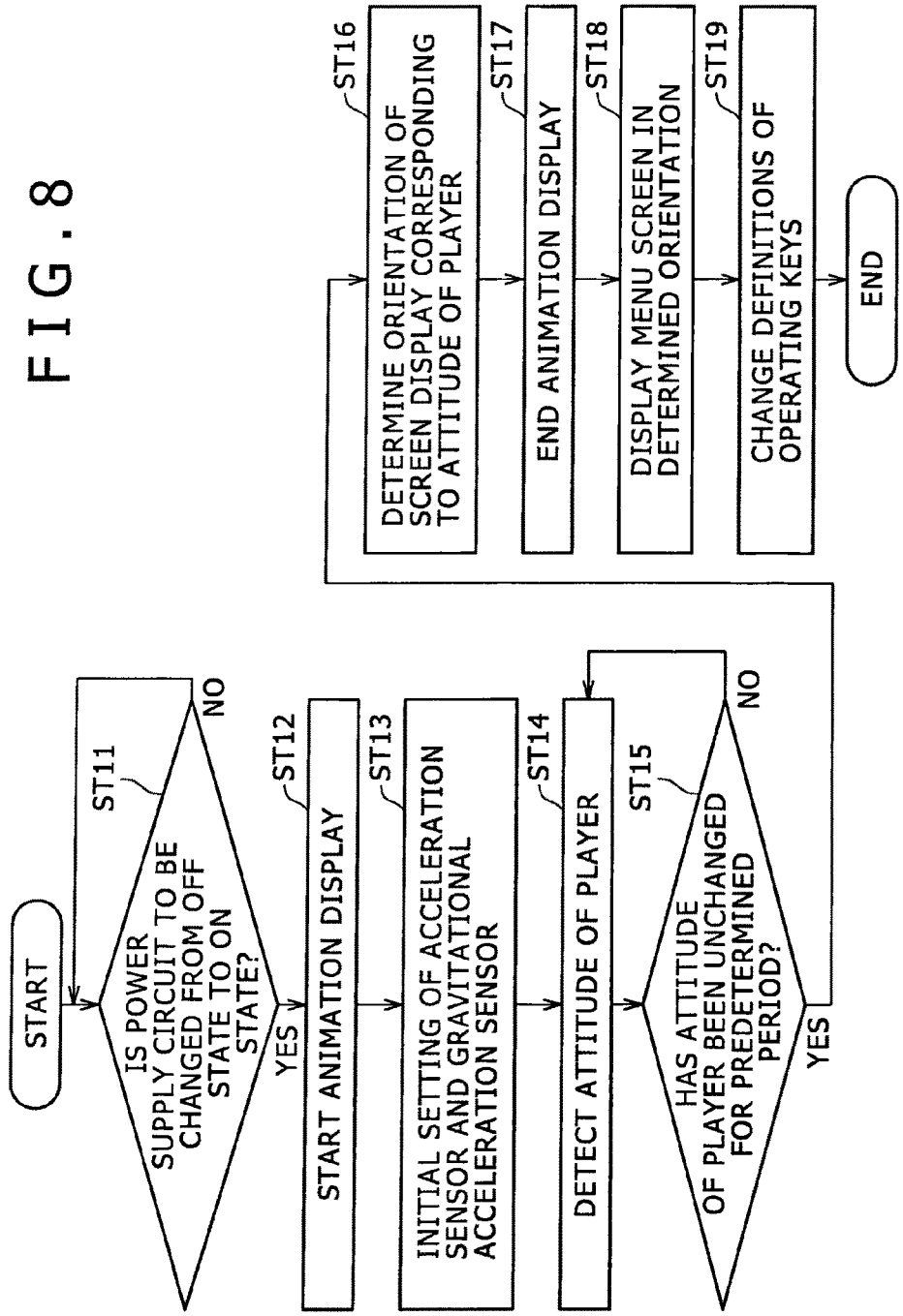
FIG. 8 is a flowchart of assistance in explaining an operation of a first embodiment according to the present invention.

Step ST11 shown in FIG. 8 is a first step or a first process of the present invention.

Step ST14 shown in FIG. 8 is a second step or a second process of the present invention.

Steps ST15 and ST17 shown in FIG. 8 are a third step or a third process of the present invention.

FIG. 1 is a diagram of general configuration of a portable type audio player 1 according to an embodiment of the present invention.

As shown in FIG. 1, the portable type audio player 1 includes for example a recording disk drive 11, a reproduction processing circuit 16, an audio output unit 17, a headphone terminal 18, a display memory 21, a display 23, an acceleration sensor and a gravitational acceleration sensor 31, a processing circuit 33, operating keys 41, a power supply circuit 48, a memory 45, and a control circuit 47.

Figure 2:
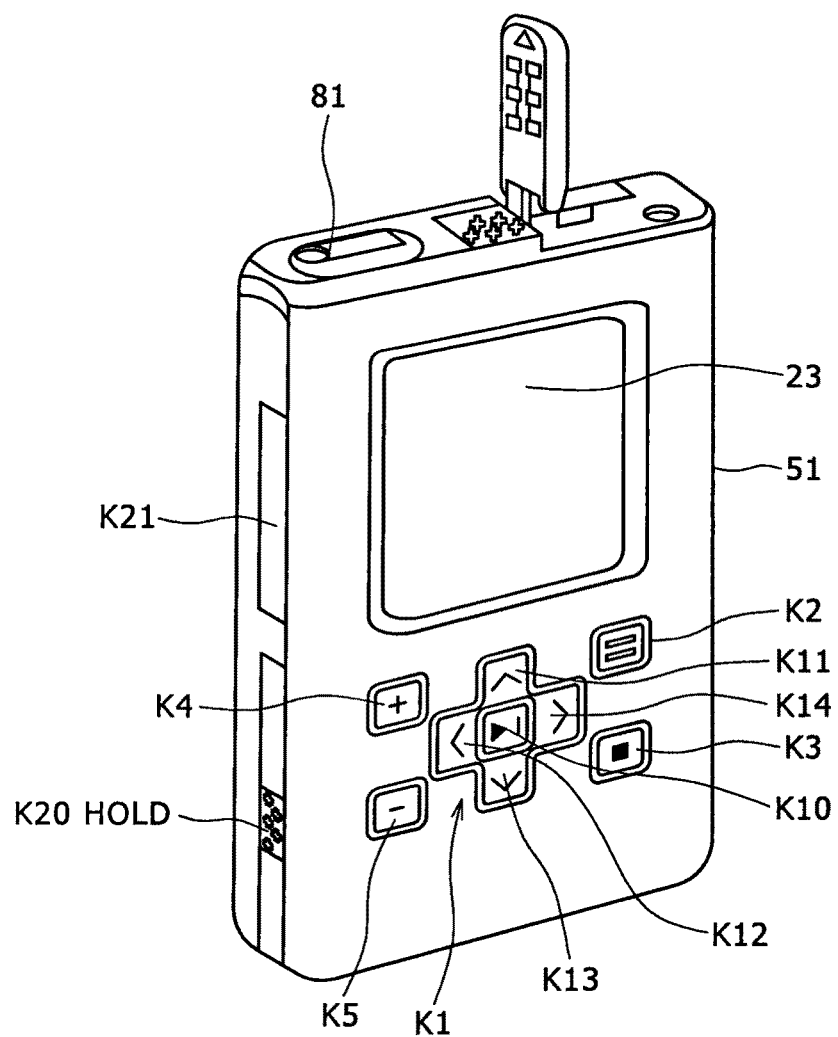
FIG. 2 is a schematic bird's-eye view of the portable type audio player shown in FIG. 1.

Each component shown in FIG. 1 is housed in a casing 51 in the shape of a thin board, as shown in FIG. 2, for example.

[Recording Disk Drive 11]

The recording disk drive 11 is for example a hard disk drive (HDD), and includes a recording disk 13, a head 14, and a head retracting part 15.

The recording disk 13 is for example a magnetic disk. Recorded on the recording disk 13 are musical piece data, accompanying data such as artist names, album names and the like accompanying the musical piece data, musical piece managing data such as a play list or the like for managing the musical piece data, recording managing data for managing the recorded data, and the like.

The head 14 reads musical piece data from the recording disk 13, and outputs the musical piece data to the reproduction processing circuit 16.

The head 14 is retained in the head retracting part 15 when the head 14 is not making access to the recording disk 13. Since the head 14 is retained so as to be fixed in the head retracting part 15, the head 14 does not damage the recording area of the recording disk 13 even when a shock is given to the portable type audio player 1.

When making access to the recording disk 13, the head 14 is released from the fixed state, and moves from the head retracting part 15 to the recording disk 13.

Under control of the control circuit 47, the head 14 reads musical piece data, accompanying data, musical piece managing data, recording managing data or the like from a specified address within the recording disk 13, and outputs the data to the reproduction processing circuit 16.

[Reproduction Processing Circuit 16]

The reproduction processing circuit 16 writes musical piece data read from the recording disk 13 by the head 14 to a buffer memory BUF, reads the musical piece data from the buffer memory BUF, performs reproduction processing on the musical piece data, and then outputs a reproduced signal to the audio output unit 17.

In addition, the reproduction processing circuit 16 outputs information necessary to reproduce a musical piece, such as accompanying data, musical piece managing data, recording managing data and the like, other than the musical piece data to be output as audio, to the control circuit 47.

[Audio Output Unit 17]

The audio output unit 17 amplifies the reproduced signal output from the reproduction processing circuit 16, and outputs the amplified reproduced signal to headphones via the headphone terminal 18 shown in FIG. 1.

[Display Memory 21]

The display memory 21 stores image data corresponding to a screen to be displayed on the display 23. The control circuit 47 writes the image data to the display memory 21. The data written in the display memory 21 is output to the display 23.

[Display 23]

The display 23 is a liquid crystal display, an organic electroluminescence display or the like. The display 23 displays the image data written in the display memory 21.

[Display Unit 24]

A display unit 24 is a module having the functions of the display memory 21 and the display 23.

[Operating Keys 41]

Figure 3:
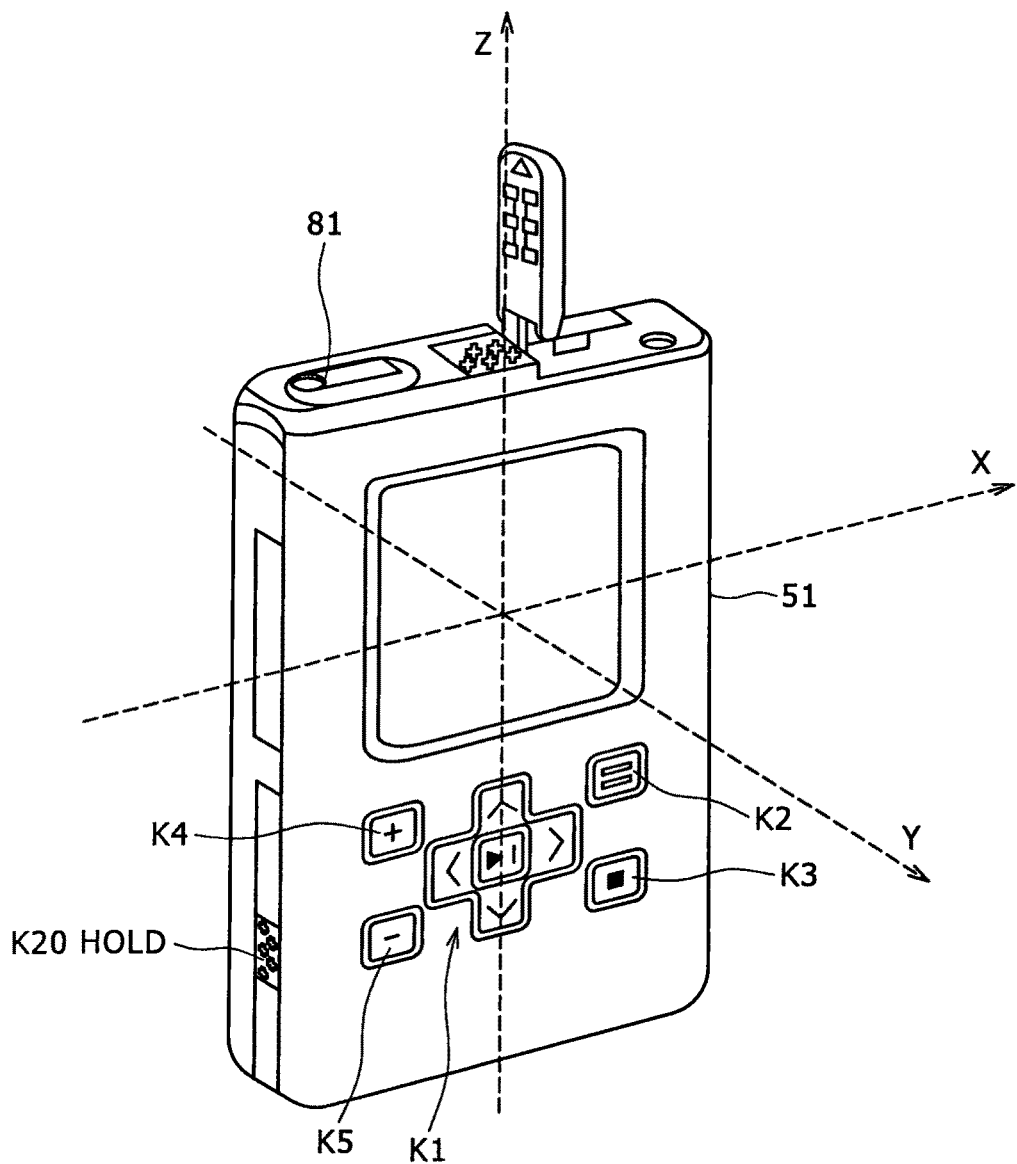
FIG. 3 is a diagram showing relative coordinates with reference to the portable type audio player shown in FIG. 1 and an X axis, a Y axis, and a Z axis of the relative coordinates.
Figure 4:
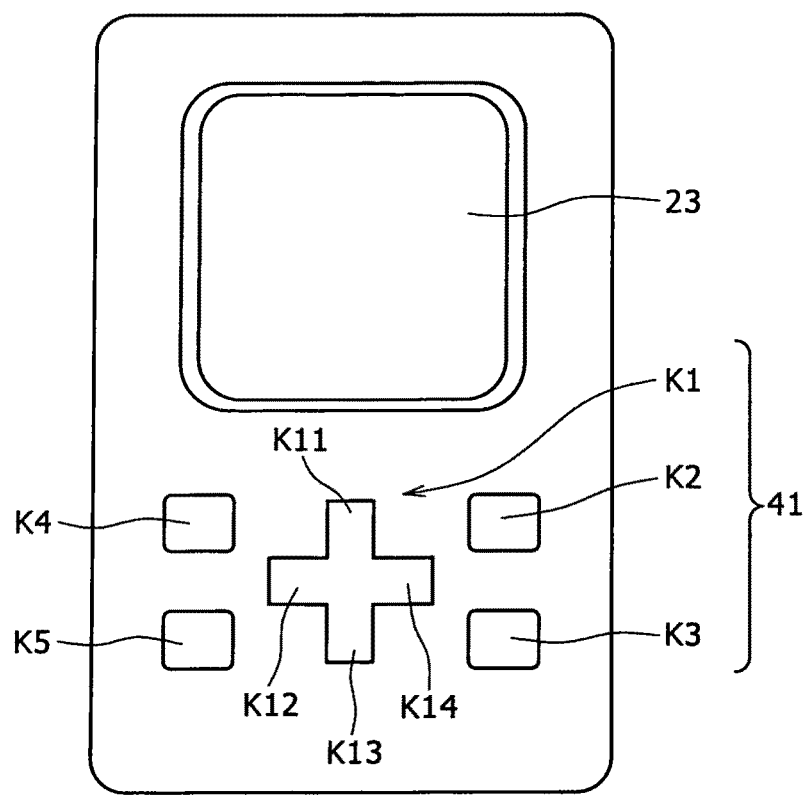
FIG. 4 is a diagram of a configuration on a front side of the portable type audio player shown in FIG. 1.

The operating keys 41 are for example a cross key K1, a SEARCH/MENU key K2, a stop key K3, a sound volume increasing key K4, a sound volume decreasing key K5, a HOLD key K20, a power supply key K21 and the like, as shown in FIG. 2, FIG. 3, FIG. 4 and the like.

The cross key K1 includes operating keys K10, K11, K12, K13, and K14.

As shown in FIG. 3, relative coordinates X, Y, and Z with reference to the portable type audio player 1 are defined for the portable type audio player 1. When consideration is given from the relative coordinates X, Y, and Z with reference to the portable type audio player 1, the operating keys K11, K12, K13, and K14 of the cross key K1 with respect to the operating key K10 of the cross key K1 are positioned in a +Z direction, a −X direction, a −Z direction, and a +X direction, respectively.

Similarly, when consideration is given from the relative coordinates X, Y, and Z with reference to the portable type audio player 1, the operating keys 41 are provided in the −Z direction with respect to the display 23.

[Acceleration Sensor and Gravitational Acceleration Sensor 31]

As shown in FIG. 3, for the portable type audio player 1, an X axis, a Y axis, and a Z axis are defined as coordinate axes of the relative coordinates X, Y, and Z with reference to the portable type audio player 1. Incidentally, an origin of the relative coordinates and a center of a display surface of the display 23 are defined so as to coincide with each other when viewed from the Y axis. The acceleration sensor and the gravitational acceleration sensor 31 detect acceleration in an X direction, a Y direction, and a Z direction on the X axis, the Y axis, and the Z axis. The acceleration sensor and the gravitational acceleration sensor 31 output an acceleration signal A_X indicating acceleration in the X direction, an acceleration signal A_Y indicating acceleration in the Y direction, and an acceleration signal A_Z indicating acceleration in the Z direction to the processing circuit 33. In a state free from acceleration by factors other than gravity, in particular, an addition of the acceleration signals A_X, A_Y, and A_Z of the X direction, the Y direction, and the Z direction is a gravitational acceleration signal A_G of gravitational acceleration.

The direction of gravitational acceleration is changed at any time depending on an inclination of the portable type audio player 1 in the relative coordinates X, Y, and Z of the portable type audio player 1 shown in FIG. 3. However, when absolute coordinate axes $X_0$ and $Z_0$ with reference to the direction of gravity are defined as shown in FIG. 5S, the direction of gravitational acceleration is always a $-Z_0$ direction on the $Z_0$ axis as a coordinate axis of absolute coordinates.

[Processing Circuit 33]

The processing circuit 33 performs a fall detecting process of detecting a fall of the portable type audio player 1 and an attitude detecting process of detecting the attitude of the portable type audio player 1 on the basis of the acceleration signals A_X, A_Y, and A_Z output from the acceleration sensor and the gravitational acceleration sensor 31. When the acceleration signals A_X, A_Y, and A_Z input from the acceleration sensor and the gravitational acceleration sensor 31 satisfy a set condition, the processing circuit 33 determines that the portable type audio player 1 is falling, and outputs a fall detection signal S33a to the control circuit 47.

Various fall determining methods using the acceleration signals A_X, A_Y, and A_Z are conceivable. For example, in a case where the acceleration sensor and the gravitational acceleration sensor 31 are situated at a center of gravity of the portable type audio player 1, there is a method of determining that the portable type audio player 1 is falling when a combined signal of the acceleration signals A_X, A_Y, and A_Z indicates "0". In the present application, this is used as an embodiment.

In addition, on the basis of the acceleration signals A_X, A_Y, and A_Z, the processing circuit 33 detects which of attitudes STATE 1, STATE 2, and STATE 3 shown in FIG. 5A, FIG. 5B, and FIG. 5C is the attitude of the portable type audio player 1.

As described earlier, an addition of the acceleration signals A_X, A_Y, and A_Z is the gravitational acceleration signal A_G of gravitational acceleration in a state free from acceleration by factors other than gravity. Because the direction of gravitational acceleration coincides with the $-Z_0$ direction, it is possible to determine a degree of inclination of the relative coordinate axes of the portable type audio player 1 with respect to the absolute coordinate axes with reference to the direction of gravitational acceleration. On the basis of this inclination, the control means detects which of the attitudes STATE 1, STATE 2, and STATE 3 shown in FIG. 5A, FIG. 5B, and FIG. 5C is the attitude of the portable type audio player 1.

As shown in FIG. 5A, the attitude STATE 1 is the attitude of the portable audio player 1 when the X axis as a relative coordinate axis of the portable type audio player 1 intersects the X axis as the absolute coordinate axis with reference to the direction of gravitational acceleration at an angle of 60° to 180°. That is, the attitude STATE 1 is a state in which the display 23 is situated in the $+Z_0$ direction with respect to the operating keys K1, K2, K3, K4, and K5.

As shown in FIG. 5B, the attitude STATE 2 is the attitude of the portable audio player 1 when the X axis as the relative coordinate axis of the portable type audio player 1 intersects the $X_0$ axis as the absolute coordinate axis with reference to the direction of gravitational acceleration at an angle of 60° to 180°. That is, the attitude STATE 2 is a state in which the display 23 is situated in the $+X_0$ direction with respect to the operating keys K1, K2, K3, K4, and K5.

As shown in FIG. 5C, the attitude STATE 3 is the attitude of the portable audio player 1 when the X axis as the relative coordinate axis of the portable type audio player 1 intersects the $X_0$ axis as the absolute coordinate axis with reference to the direction of gravitational acceleration at an angle of 180° to 300°. That is, the attitude STATE 3 is a state in which the display 23 is situated in the $-X_0$ direction with respect to the operating keys K1, K2, K3, K4, and K5.

When detecting which of STATE 1, STATE 2, and STATE 3 is the positional relation between the display 23 and the operating keys K1, K2, K3, K4, and K5 of the portable type audio player 1, a component in the Y axis direction of the portable type audio player 1 is not needed. That is, the positional relation between the display 23 and the operating keys K1, K2, K3, K4, and K5 of the portable type audio player 1 on the $X_0$ axis and the $Z_0$ axis as absolute coordinate axes depends only on the X axis and the Z axis as relative coordinate axes set to the portable type audio player 1. The processing circuit 33 therefore detects the attitude of the portable type audio player 1 using only the acceleration signals A_X and A_Z.

Hence, when control as described above is performed, a two-axis acceleration sensor, rather than a three-axis acceleration sensor, may be used as the acceleration sensor and the gravitational acceleration sensor 31.

On the basis of the attitude thus detected, the processing circuit 33 outputs an attitude detection signal S33b indicating which of STATE 1, STATE 2, and STATE 3 corresponds to the detected attitude to the control circuit 47. For example, a number such as one for STATE 1, two for STATE 2, or the like is output from the processing circuit 33 to the control circuit 47.

[Attitude Detecting Unit 34]

An attitude detecting unit 34 is a module having attitude detecting functions in the acceleration sensor and the gravitational acceleration sensor 31 and the processing circuit 33.

[Fall Detecting Unit 35]

A fall detecting unit 35 is a module having fall detecting functions in the acceleration sensor and the gravitational acceleration sensor 31 and the processing circuit 33.

[Battery 43]

A battery 43 supplies power to the portable audio player 1.

[Power Supply Circuit 48]

When an instruction to turn on power is input from the control circuit 47 to the power supply circuit 48, the power supply circuit 48 is supplied with power from the battery 43, performs voltage conversion necessary for the portable type audio player 1, and then supplies power to each component of the portable type audio player 1. When an instruction to turn off power is input from the control circuit 47 to the power supply circuit 48, the power supply circuit 48 stops the supply of the power.

[Memory 45]

The memory 45 includes a ROM and a RAM. The ROM stores a program PRG that cannot be rewritten as well as fixed data. The RAM stores data temporarily stored for work.

[Control Circuit 47]

The control circuit 47 executes the program PRG read from the ROM of the memory 45, and controls the operation of the portable type audio player 1 defined in the first embodiment.

When a fall detection signal S33a is input from the processing circuit 33, the control circuit 47 controls the recording disk drive 11 so as to retract the head 14 to the head retracting part 15.

In addition, when power supply to the portable type audio player 1 is changed from an off state to an on state, the control circuit 47 rewrites image data stored in the display memory 21 so that an image is displayed on the display 23 in an orientation corresponding to the attitude of the portable type audio player 1 which attitude is indicated by an attitude detection signal S33b from the processing circuit 33.

Figure 6A:
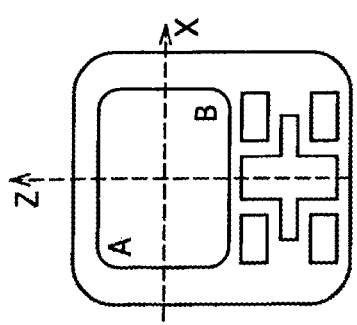
FIG. 6A is a diagram showing the orientation of the screen displayed on the display when the attitude of the portable type audio player shown in FIG. 1 is STATE 1.
Figure 6B:
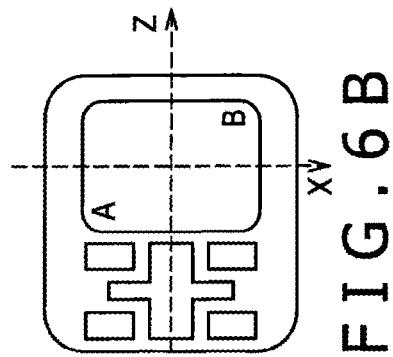
FIG. 6B is a diagram showing the orientation of the screen displayed on the display when the attitude of the portable type audio player shown in FIG. 1 is STATE 2.
Figure 6S:
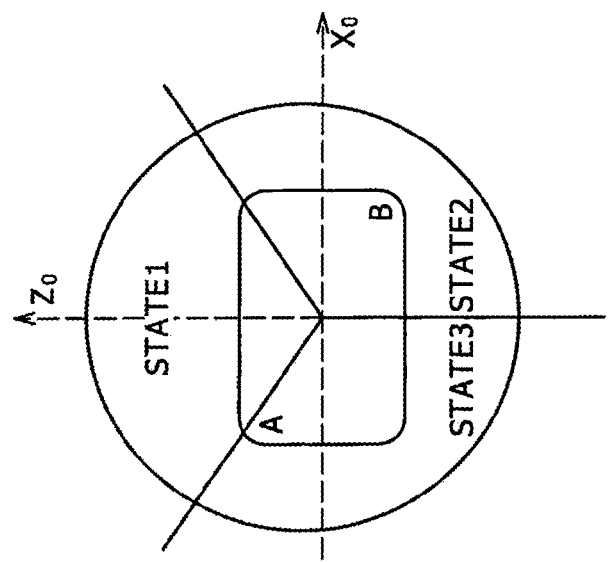
FIG. 6S is a diagram showing a screen displayed on a display 23 of the portable type audio player shown in FIG. 1, as viewed from the absolute coordinates with reference to the direction of gravitational acceleration.

Relations between the attitude of the portable type audio player 1 which attitude is indicated by the attitude detection signal S33b and image data displayed on the display 23 are shown in FIG. 6S, FIG. 6A, FIG. 6B, and FIG. 6C. FIG. 6S shows a state in which a letter A is displayed in an area of $-X_0$ and $+Z_0$ of the display 23 and a letter B is displayed in an area of $+X_0$ and $-Z_0$ of the display 23 in the absolute coordinates with reference to the direction of gravitational acceleration. The letters A and B are controlled by the control circuit 47 so as to be displayed in the same areas on the display 23 at all times irrespective of the attitude of the portable type audio player 1 when viewed from the absolute coordinates with reference to gravitational acceleration.

Figure 6C:
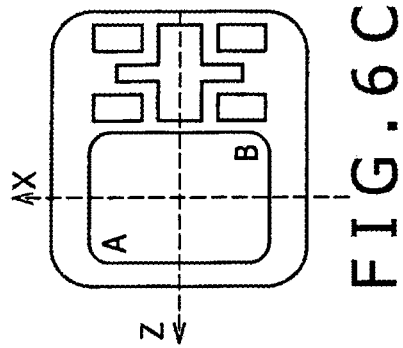
FIG. 6C is a diagram showing the orientation of the screen displayed on the display when the attitude of the portable type audio player shown in FIG. 1 is STATE 3.

On the other hand, FIG. 6A, FIG. 6B, and FIG. 6C show where the letters A and B are displayed in the relative coordinates of the portable type audio player 1 when the attitude of the portable type audio player 1 is STATE 1, STATE 2, and STATE 3, respectively. Incidentally, the X axis and Y axis of the relative coordinates with reference to the portable type audio player 1 are the same as the X axis and Y axis shown in FIG. 3, FIG. 5A, FIG. 5B, and FIG. 5C. The letter A displayed in the $-X_0$ and $+Z_0$ direction of the display 23 and the letter B displayed in the $+X_0$ and $-Z_0$ direction of the display 23 in the absolute coordinates with reference to the direction of gravitational acceleration are displayed in the following coordinate areas in the relative coordinates of the portable audio player 1.

In the case of STATE 1, the letter A is displayed in a $-X$ and $+Z$ area, and the letter B is displayed in a $+X$ and $-Z$ area.

In the case of STATE 2, the letter A is displayed in a $-X$ and $-Z$ area, and the letter B is displayed in a $+X$ and $+Z$ area.

In the case of STATE 3, the letter A is displayed in the $+X$ and $+Z$ area, and the letter B is displayed in the $-X$ and $-Z$ area.

Thus, the image data displayed on the portable audio player 1 is processed by the control circuit 47 such that the coordinate areas of the absolute coordinates are not changed when viewed from the absolute coordinates. The image data displayed on the display 23 is displayed by a set of numerous dots. The control circuit 47 subjects coordinates representing a position of a dot in the relative coordinates with reference to the portable type audio player 1 to coordinate transformation. Incidentally, at this time, the image data is processed in such a manner as not to change the orientation of letters or an image as viewed from the absolute coordinates with reference to the direction of gravitational acceleration. Such a dot coordinate transformation requires CPU power, and thus consumes very much power. Thus, the control circuit 47 processes the image data such that the image is in an orientation corresponding to the attitude of the portable type audio player 1 which attitude is indicated by the attitude detection signal S33b.

In the first embodiment, the control circuit 47 processes the image data such that the image is in an orientation corresponding to the attitude of the portable type audio player 1 which attitude is indicated by the attitude detection signal S33b when the image data to be displayed by the display 23 is stored in the display memory 21. The image displayed on the display 23 can thereby be changed to the orientation corresponding to the attitude of the portable type audio player 1 which attitude is indicated by the attitude detection signal S33b.

In addition to such a configuration, it is possible to provide the display memory 21 with an image data processing capability, for example. In such a case, the display memory 21 processes the image data such that the image is displayed on the display 23 in the orientation corresponding to the attitude of the portable type audio player 1 which attitude is indicated by the attitude detection signal S33b. The display memory 21 processes the image data, whereby the image displayed on the display 23 can thereby be changed to the orientation corresponding to the attitude of the portable type audio player 1 which attitude is indicated by the attitude detection signal S33b. When the display memory 21 processes the image data, the display memory 21 may process in advance and store the image data in the orientation corresponding to the attitude of the portable type audio player 1 which attitude is indicated by the attitude detection signal S33b, and output the processed image data to the display 23, or the display memory 21 may output the image data to the display 23 while processing the image data.

Further, the control circuit 47 changes the functions of the operating keys K11, K12, K13, and K14 of the cross key K1 by changing definitions assigned to the operating keys K11, K12, K13, and K14 according to the attitude indicated by the attitude detection signal S33b.

When the attitude detection signal S33b indicates the attitude STATE 1, the control circuit 47 assigns definitions to the operating keys K11, K12, K13, and K14 of the cross key K1 as shown in FIG. 7A.

When the attitude detection signal S33b indicates the attitude STATE 2, the control circuit 47 assigns definitions to the operating keys K11, K12, K13, and K14 of the cross key K1 as shown in FIG. 7B.

When the attitude detection signal S33b indicates the attitude STATE 3, the control circuit 47 assigns definitions to the operating keys K11, K12, K13, and K14 of the cross key K1 as shown in FIG. 7C.

The control circuit 47 changes the functions of the operating keys K11, K12, K13, and K14 by changing definitions assigned to the operating keys K11, K12, K13, and K14 according to the attitude of the portable type audio player 1 as shown in FIG. 7A, FIG. 7B, and FIG. 7C. Thus, the operating keys disposed in the $+X_0$ direction, the $-X_0$ direction, the $+Z_0$ direction, and the $-Z_0$ direction with reference to the direction of gravitational acceleration have the same functions at all times even when the orientation of the screen is changed. The user can therefore operate the portable type audio player 1 without being confused when the orientation of the screen is changed.

Incidentally, for example, the definition lists shown in FIG. 7A, FIG. 7B, and FIG. 7C may be stored in the ROM of the memory 45 in advance. Alternatively, the definition lists shown in FIG. 7A, FIG. 7B, and FIG. 7C may be generated by the control circuit 47 on the basis of the attitude of the portable type audio player 1 when changing the definitions of the operating keys, and stored in the RAM of the memory 45.

All or a part of the functions of the processing circuit 33 and the control circuit 47 in the portable type audio player 1 may be implemented as an electronic circuit, or may be implemented by executing the program PRG read from the memory 45 by a central processing unit (CPU).

Examples of operation of the portable type audio player 1 will be described below.

First Example of Operation

Description will be made below of an example of operation when power supply to the portable type audio player 1 is changed from an off state to an on state.

FIG. 8 is a flowchart of assistance in explaining the example of operation.

Step ST11:

The control circuit 47 determines whether an instruction to change the power supply circuit 48 of the portable type audio player 1 from an off state to an on state is input on the basis of an operating signal from the operating keys 41. When the control circuit 47 determines that the instruction is input, the process proceeds to step ST12.

Step ST12:

The control circuit 47 changes the power supply circuit 48 from the off state to the on state.

In addition, the control circuit 47 writes initial animation image data in a predetermined orientation at the time of turning on power to the display memory 21. Thus, an animation image is displayed on the display 23 when the process of steps ST12, ST13, ST14, ST15, and ST16 is performed.

Step ST13:

Power supply from the power supply circuit 48 to the acceleration sensor and the gravitational acceleration sensor 31 is thereby started. The acceleration sensor and the gravitational acceleration sensor 31 start an initial setting operation.

Step ST14:

After ending the initial setting operation, the acceleration sensor and the gravitational acceleration sensor 31 detect acceleration in the X direction, the Y direction, and the Z direction, and output an acceleration signal A_X indicating the acceleration in the X direction, an acceleration signal A_Y indicating the acceleration in the Y direction, and an acceleration signal A_Z indicating the acceleration in the Z direction to the processing circuit 33.

On the basis of the acceleration signals A_X and A_Z, the processing circuit 33 detects which of the attitudes STATE 1, STATE 2, and STATE 3 shown in FIG. 5A, FIG. 5B, and FIG. 5C and FIG. 6A, FIG. 6B, and FIG. 6C is the attitude of the portable type audio player 1.

The processing circuit 33 outputs an attitude detection signal S33b indicating the detected attitude to the control circuit 47.

Step ST15:

The control circuit 47 repeats the detection of the attitude in step ST14 a few times to determine whether the attitude detected in step ST14 is retained for a predetermined period of time. When the control circuit 47 determines that the attitude detected in step ST14 is retained for the predetermined period of time, the process proceeds to step ST16. When the control circuit 47 determines that the attitude is changed, the process returns to step ST14 to continue the detection of the attitude of the portable type audio player 1.

Incidentally, in the first embodiment, the control circuit 47 determines whether the attitude of the portable type audio player 1 is retained by repeating the detection of the attitude a few times. For example, however, after a first detection of the attitude of the portable type audio player 1, the control circuit 47 may detect the attitude of the portable type audio player 1 again after a predetermined period from the first detection, and determine that the attitude of the portable type audio player 1 is retained when results of the two detections are the same.

Step ST16:

As shown in FIG. 5A, FIG. 5B, and FIG. 5C and FIG. 6A, FIG. 6B, and FIG. 6C, the control circuit 47 determines an orientation of display corresponding to the attitude of the portable type audio player 1 which attitude is indicated by the attitude detection signal S33b input from the processing circuit 33 in step ST14.

Step ST17:

The control circuit 47 erases the animation image data written in the display memory 21, and thereby ends the display of the animation image displayed on the display 23.

Step ST18:

The control circuit 47 writes the image data of a menu screen to the display memory 21 so as to display the menu screen in an orientation corresponding to the attitude of the portable type audio player 1 which attitude is indicated by the attitude detection signal S33b input in step ST14, as shown in FIG. 5A, FIG. 5B, and FIG. 5C and FIG. 6A, FIG. 6B, and FIG. 6C.

Thus, the menu screen is displayed on the display 23 following the animation image.

Step ST19:

The control circuit 47 changes the functions of the operating keys K11, K12, K13, and K14 by assigning definitions to the operating keys K11, K12, K13, and K14 as shown in FIG. 7A, FIG. 7B, or FIG. 7C according to the attitude STATE 1, STATE 2, or STATE 3 of the portable type audio player 1 which attitude is indicated by the attitude detection signal S33b input from the processing circuit 33.

The processing circuit 33 thereafter detects only a fall of the portable type audio player 1 until the power supply to the portable type audio player 1 is changed from an off state to an on state next time.

Various methods of performing control so as to stop the attitude detection of the portable type audio player 1 are conceivable. The methods include for example a method of performing control by the control circuit 47 so as to stop the processing circuit 33 from detecting the attitude of the portable type audio player 1, a method in which the processing circuit 33 detects the attitude of the portable type audio player 1 but does not output the attitude detection signal S33b as a result of the detection to the control circuit 47, and a method in which the processing circuit 33 detects the attitude of the portable type audio player 1 and outputs the attitude detection signal S33b as a result of the detection to the control circuit 47, but the control circuit 47 does not receive the attitude detection signal S33b. For a purpose of reducing power consumption, it is most desirable that the control circuit 47 perform control so as to stop the processing circuit 33 from detecting the attitude.

Generally, the portable type audio player 1 or the like always rewrites a part of the display memory 21 for horizontal scrolling of an index at which a cursor is placed, for example. However, the present invention can greatly reduce power consumption by performing a process of rotating an image displayed on the display 23, in particular, which process requires extensive rewriting of the display memory 21, only at a time of turning on power. The portable type audio player 1 operates on power supplied from the battery 43, and therefore needs to minimize power consumption in order to perform operation for a longer time. Considering user benefits, it is necessary to minimize the number of times that a process requiring much CPU power is performed. The present invention is effective also in players and the like operating on such a battery.

Second Example of Operation

Description will be made in the following of an example of operation when the portable type audio player 1 falls.

Figure 9:
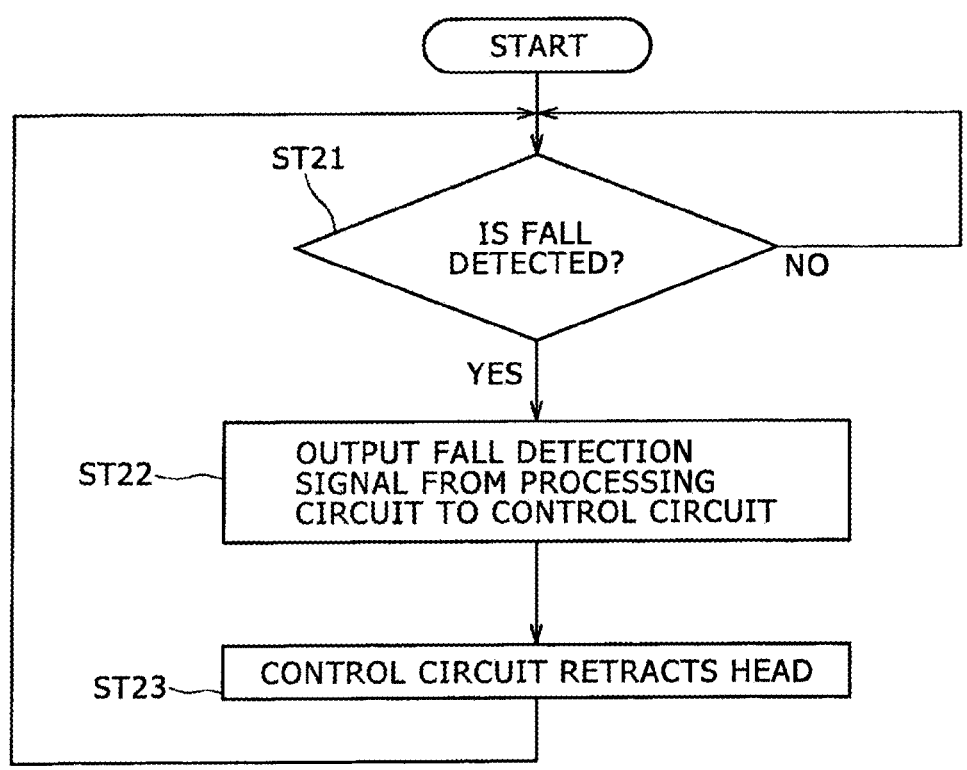
FIG. 9 is a flowchart of assistance in explaining an operation of the first embodiment according to the present invention at a time of a fall.

FIG. 9 is a flowchart of assistance in explaining the example of operation.

Step ST21:

The processing circuit 33 determines whether the portable type audio player 1 is falling on the basis of acceleration signals A_X, A_Y, and A_Z input from the acceleration sensor and the gravitational acceleration sensor 31. When the processing circuit 33 determines that the portable type audio player 1 is falling, the process proceeds to step ST22.

Step ST22:

The processing circuit 33 outputs a fall detection signal S33a to the control circuit 47 on the basis of the determination in step ST21.

Step ST23:

When the fall detection signal S33a is input from the processing circuit 33, the control circuit 47 controls the recording disk drive 11 so as to retract the head 14 to the head retracting part 15.

As described above, the portable type audio player 1 according to the first embodiment detects the attitude of the portable type audio player 1 on condition that the power supply to the portable type audio player 1 is changed from an off state to an on state, displays a menu screen in an orientation corresponding to the attitude of the portable type audio player 1 on the display 23, and does not detect the attitude of the portable audio player 1 on other conditions than the condition that the power supply to the portable type audio player 1 is changed from an off state to an on state.

Thus, as compared with the conventional device, the portable type audio player 1 greatly reduces the number of times that the orientation of the screen displayed on the display 23 is changed, and can thereby save power.

The portable type audio player 1 can save power as compared with the conventional device especially when a user is using the portable type audio player 1 while walking with the portable type audio player 1 carried in a bag or the like, for example.

Second Embodiment

Figure 10:
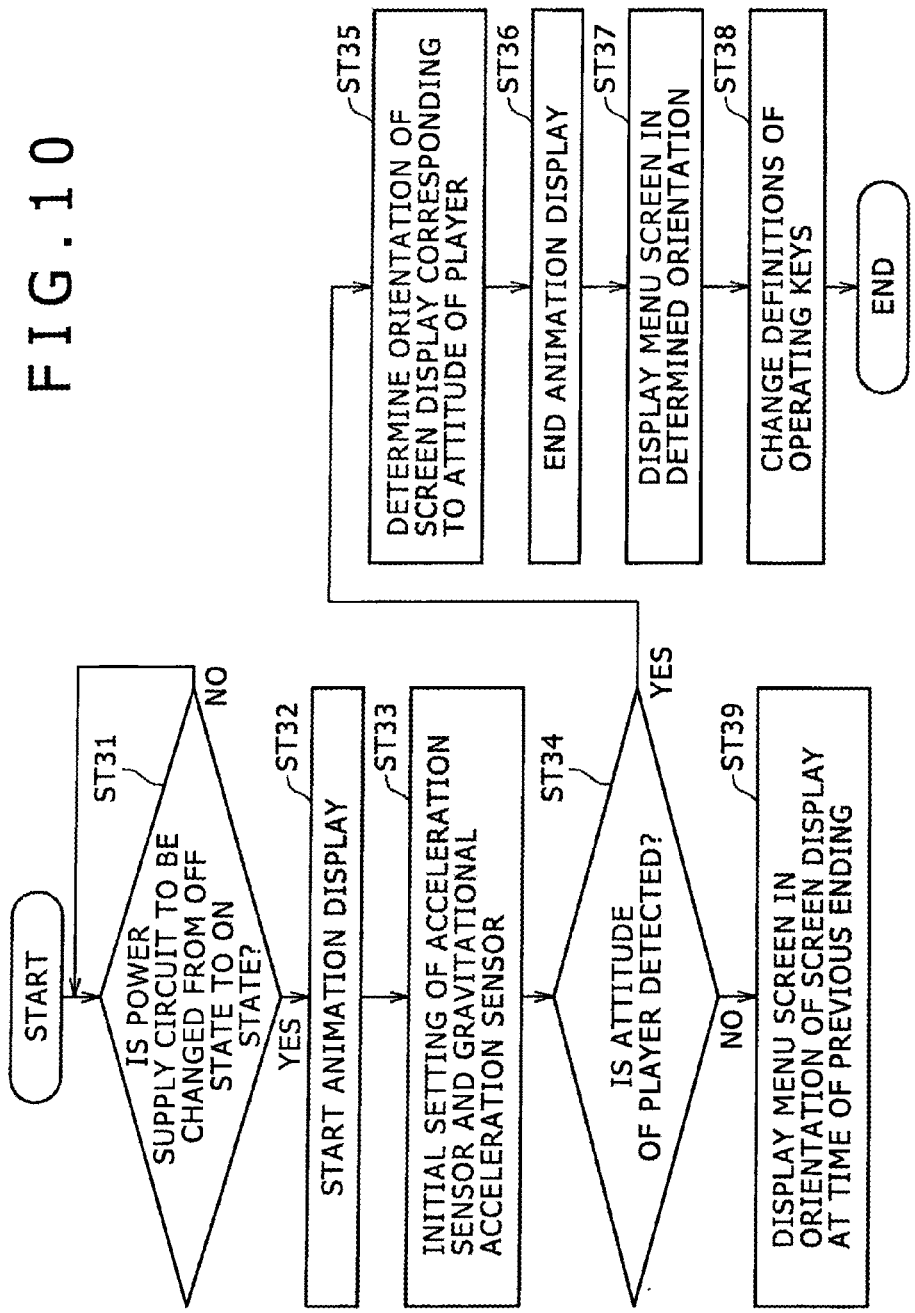
FIG. 10 is a flowchart of assistance in explaining an operation of a second embodiment according to the present invention.

A second embodiment is different from the first embodiment described above in only processing by the control circuit 47 when the attitude of the portable type audio player 1 is detected. FIG. 10 is a diagram of assistance in explaining the second embodiment. In step ST34 in FIG. 10, the control circuit 47 determines whether the attitude of the portable type audio player 1 is detected by attitude detection. When the attitude is detected, the process proceeds to step ST35. When the attitude is not detected, for example when the portable type audio player 1 is rotated at all times, the process proceeds to step ST39. In step ST39, the control circuit 47 displays a menu screen in an orientation of a screen displayed at a time of previous ending. Other parts have been described in the first embodiment, and therefore description thereof will be omitted.

Third Embodiment

In the foregoing embodiments, a case is illustrated in which a screen is displayed in an orientation corresponding to the attitude of the portable type audio player 1 on condition that the power supply to the portable type audio player 1 is changed from an off state to an on state as in step ST11 shown in FIG. 8.

On the other hand, a third embodiment displays a screen in an orientation corresponding to the attitude of a portable type audio player 1 on condition that a display on a display 23 in the portable type audio player 1 is changed from a screen-saver screen to a normal menu screen.

Figure 11:
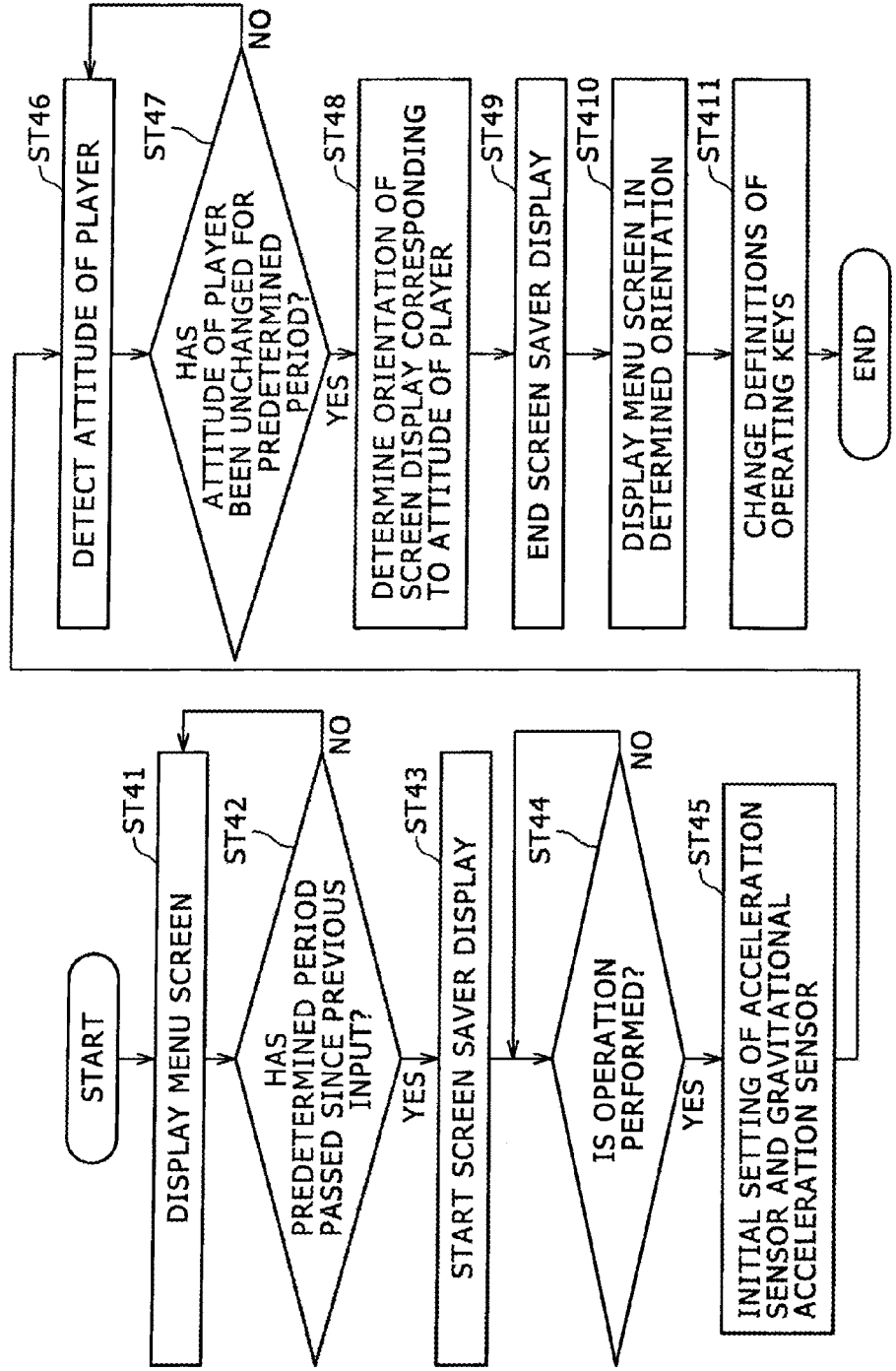
FIG. 11 is a flowchart of assistance in explaining an operation of a third embodiment according to the present invention.

FIG. 11 is a flowchart of assistance in explaining a screen orientation changing process in the portable type audio player 1 according to the third embodiment.

Step ST41:

A control circuit 47 of the portable type audio player 1 performs control so as to display a menu screen on the display 23 using the image data of the menu screen which data is stored in a display memory 21.

Step ST42:

The control circuit 47 of the portable type audio player 1 determines whether the portable type audio player 1 is operated during a predetermined period. When the portable type audio player 1 is not operated during the predetermined period, the process proceeds to step ST43.

Step ST43:

When the portable type audio player 1 is not operated during the predetermined period, the control circuit 47 of the portable type audio player 1 changes the screen displayed on the display 23 from the normal menu screen or the like to a screen-saver screen.

Step ST44:

The control circuit 47 of the portable type audio player 1 monitors whether the portable type audio player 1 is operated. When the portable type audio player 1 is operated, the process proceeds to step ST45.

Step ST45:

The control circuit 47 of the portable type audio player 1 controls an acceleration sensor and a gravitational acceleration sensor 31 so that an initial setting operation of the acceleration sensor and the gravitational acceleration sensor 31 is started.

Step ST46:

After ending the initial setting operation, the acceleration sensor and the gravitational acceleration sensor 31 detect acceleration in the X direction, the Y direction, and the Z direction, and output an acceleration signal A_X indicating the acceleration in the X direction, an acceleration signal A_Y indicating the acceleration in the Y direction, and an acceleration signal A_Z indicating the acceleration in the Z direction to a processing circuit 33.

On the basis of the acceleration signals A_X and A_Z, the processing circuit 33 detects which of the attitudes STATE 1, STATE 2, and STATE 3 shown in FIG. 5A, FIG. 5B, and FIG. 5C and FIG. 6A, FIG. 6B, and FIG. 6C is the attitude of the portable type audio player 1.

The processing circuit 33 outputs an attitude detection signal S33b indicating the detected attitude to the control circuit 47.

Step ST47:

The control circuit 47 determines whether the attitude detected in step ST46 is retained for a predetermined period of time. When the control circuit 47 determines that the attitude detected in step ST46 is retained for the predetermined period of time, the process proceeds to step ST48. When the control circuit 47 determines that the attitude is changed, the process returns to step ST46 to detect the attitude of the portable type audio player 1 again.

Step ST48:

As shown in FIG. 5A, FIG. 5B, and FIG. 5C and FIG. 6A, FIG. 6B, and FIG. 6C, the control circuit 47 determines an orientation of display corresponding to the attitude of the portable type audio player 1 which attitude is indicated by the attitude detection signal S33b input from the processing circuit 33 in step ST46.

Step ST49:

The control circuit 47 erases screen saver data written in the display memory 21, and thereby ends display of the screen-saver screen displayed on the display 23.

Step ST410:

The control circuit 47 writes the image data of a menu screen to the display memory 21 so as to display the menu screen in an orientation corresponding to the attitude of the portable type audio player 1 which attitude is indicated by the attitude detection signal S33b input to the control circuit 47 in step ST46, as shown in FIG. 5A, FIG. 5B, and FIG. 5C and FIG. 6A, FIG. 6B, and FIG. 6C.

Thus, the menu screen is displayed on the display 23 following the screen-saver screen.

Step ST411:

The control circuit 47 changes the functions of operating keys K11, K12, K13, and K14 by assigning definitions to the operating keys K11, K12, K13, and K14 as shown in FIG. 7A, FIG. 7B, or FIG. 7C according to the attitude STATE 1, STATE 2, or STATE 3 of the portable type audio player 1 which attitude is indicated by the attitude detection signal S33b input from the processing circuit 33.

Thereafter, the processing circuit 33 detects only a fall of the portable type audio player 1, and does not detect the attitude of the portable type audio player 1 until the power supply to the portable type audio player 1 is changed from an off state to an on state next time.

Fourth Embodiment

A fourth embodiment changes a screen display to an orientation corresponding to the attitude of a portable type audio player 1a on condition that a HOLD key K20 of the portable type audio player 1a is released.

Figure 12:
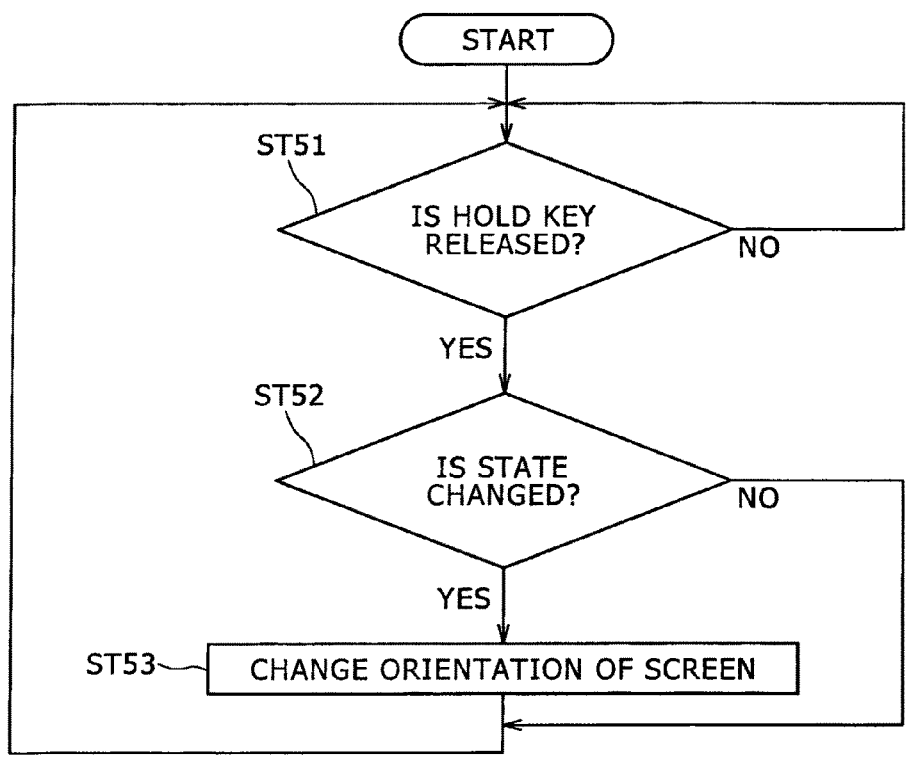
FIG. 12 is a flowchart of assistance in explaining an operation of a fourth embodiment according to the present invention.

FIG. 12 is a flowchart of assistance in explaining a screen orientation changing process in the portable type audio player 1a according to the fourth embodiment.

Step ST51:

A control circuit 47a of the portable type audio player 1a determines whether the HOLD key K20 shown in FIG. 2 is released. When the control circuit 47a determines whether the HOLD key K20 is released, the process proceeds to step ST52.

Step ST52:

The control circuit 47a determines on the basis of an attitude detection signal S33b from a processing circuit 33 whether the attitude of the portable type audio player 1 is changed between attitudes STATE 1, STATE 2, and STATE 3 shown in FIG. 5A, FIG. 5B, and FIG. 5C and FIG. 6A, FIG. 6B, and FIG. 6C. When the control circuit 47a determines that the attitude of the portable type audio player 1 is changed, the process proceeds to step ST53. Otherwise, the process returns to step ST51.

Step ST53:

The control circuit 47a changes a screen being displayed on a display 23 so as to display a screen in an orientation corresponding to the attitude changed in step ST52.

The portable type audio player 1a may have the functions described with reference to FIG. 8 in the first embodiment together with the functions described with reference to FIG. 11, or may be without the functions described with reference to FIG. 8.

Fifth Embodiment

A portable type audio player 1 according to a fifth embodiment changes a screen display to an orientation corresponding to the attitude of the portable type audio player 1, and changes the functions of operating keys on condition that one of the operating keys K11, K12, K13, and K14 of the portable type audio player 1 is operated.

Figure 13:
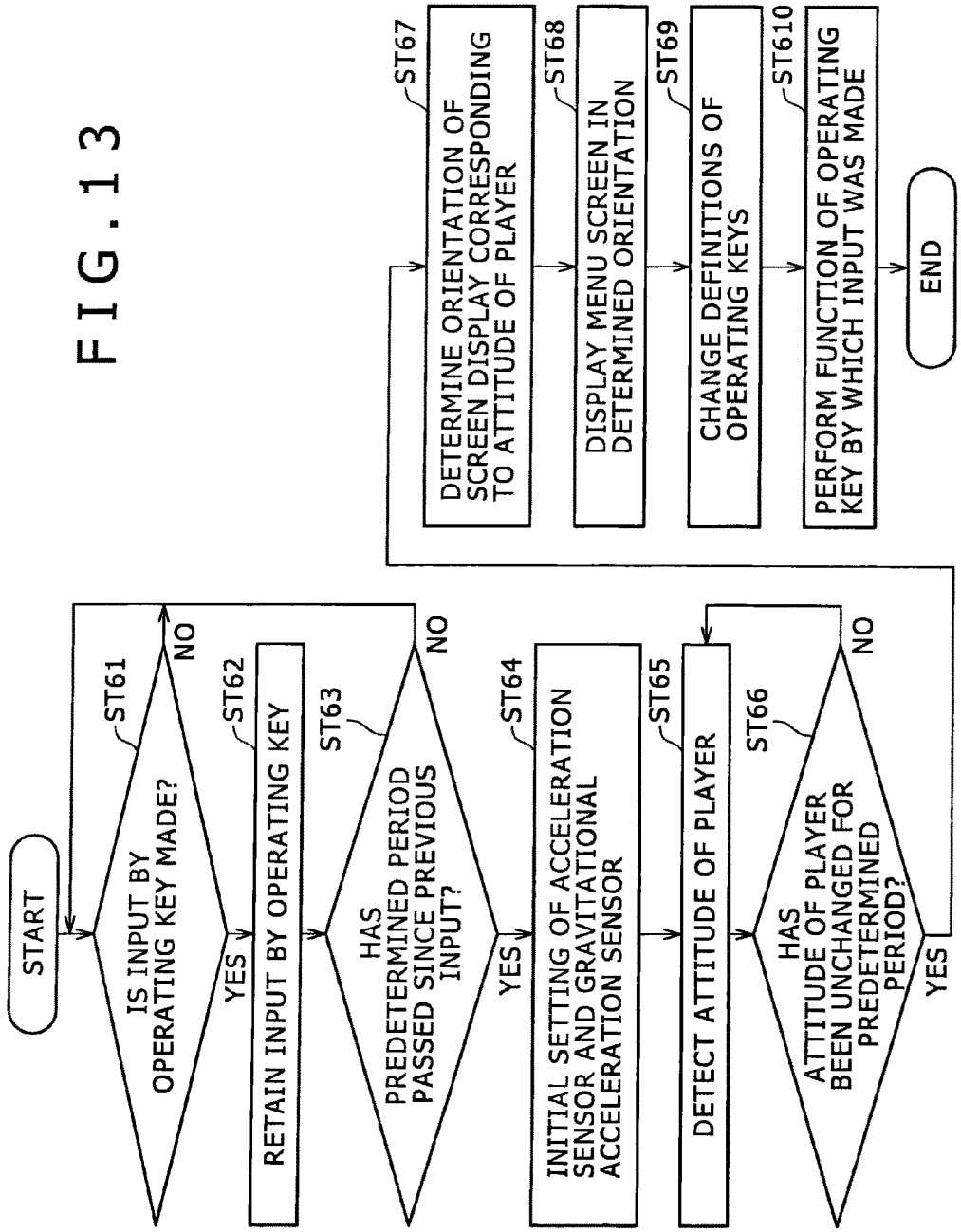
FIG. 13 is a flowchart of assistance in explaining an operation of a fifth embodiment according to the present invention.

FIG. 13 is a flowchart of assistance in explaining a process of changing the orientation of a screen and the functions of the operating keys in the portable type audio player 1 according to the fifth embodiment.

Step ST61:

A control circuit 47 determines whether an input is made by the operating key K11, K12, K13, or K14 of the portable type audio player 1. When an input is made by the operating key K11, K12, K13, or K14, the process proceeds to step ST62.

Step ST62:

The control circuit 47 retains information indicating which operating key is operated in a RAM of a memory 45, for example.

Step ST63:

The control circuit 47 determines whether the input made in step ST61 is an input made after passage of a predetermined time from a last input. When the predetermined time has passed, it can be determined that connected input operations by a user are ended. Hence, when the input in step ST61 is made after the passage of the predetermined time from the last input, the input made in step ST61 is considered to be a start of new input operations. In this case, the control circuit 47 determines that it is better to change display in such a manner as to correspond to the attitude of the portable type audio player 1. The process proceeds to step ST64.

Step ST64:

The control circuit 47 makes the acceleration sensor and the gravitational acceleration sensor 31 of the portable type audio player 1 start an initial setting operation.

Step ST65:

After ending the initial setting operation, the acceleration sensor and the gravitational acceleration sensor 31 detect acceleration in the X direction, the Y direction, and the Z direction, and output an acceleration signal A_X indicating the acceleration in the X direction, an acceleration signal A_Y indicating the acceleration in the Y direction, and an acceleration signal A_Z indicating the acceleration in the Z direction to a processing circuit 33.

On the basis of the acceleration signals A_X and A_Z, the processing circuit 33 detects which of the attitudes STATE 1, STATE 2, and STATE 3 shown in FIG. 5A, FIG. 5B, and FIG. 5C and FIG. 6A, FIG. 6B, and FIG. 6C is the attitude of the portable type audio player 1.

The processing circuit 33 outputs an attitude detection signal S33b indicating the detected attitude to the control circuit 47.

Step ST66:

The control circuit 47 determines whether the attitude detected in step ST65 is retained for a predetermined period of time. When the control circuit 47 determines that the attitude detected in step ST65 is retained for the predetermined period of time, the process proceeds to step ST67. When the control circuit 47 determines that the attitude is changed, the process returns to step ST65 to detect the attitude of the portable type audio player 1 again.

Step ST67:

As shown in FIG. 5A, FIG. 5B, and FIG. 5C and FIG. 6A, FIG. 6B, and FIG. 6C, the control circuit 47 determines an orientation of a display on a display unit which orientation corresponds to the attitude of the portable type audio player 1 which attitude is indicated by the attitude detection signal S33b input from the processing circuit 33 in step ST65.

Step ST68:

The control circuit 47 writes the image data of a menu screen to a display memory 21 so as to display the menu screen in the determined orientation.

Thereby, the menu screen is displayed on a display 23 in the orientation corresponding to the attitude of the portable type audio player 1.

Step ST69:

The control circuit 47 changes the functions of operating keys K11, K12, K13, and K14 by generating and assigning one of FIG. 7A, FIG. 7B, and FIG. 7C as lists of definitions of the operating keys K11, K12, K13, and K14 according to the attitude STATE 1, STATE 2, or STATE 3 of the portable type audio player 1 which attitude is indicated by the attitude detection signal S33b input from the processing circuit 33.

Step S610:

The control circuit 47 retains, in step ST62, information indicating which of the operating keys K11, K12, K13, and K14 was used to make the input in step ST61. In step ST610, the control circuit 47 performs a function assigned to the operating key indicated by the information retained in step ST62. The function of the operating key K11, K12, K13, or K14 which function is performed in step ST610 is a function after definitions are assigned and thereby the functions of the operating keys K11, K12, K13, and K14 are changed in step ST69.

For example, when the operating key by which the input is made in step ST61 is the operating key K11, the control circuit 47 in step ST610 performs the function of the operating key K11 after definitions are assigned to the operating keys K11, K12, K13, and K14 according to the attitude of the portable type audio player 1.

Incidentally, when a plurality of inputs are made in step ST61, for example when the operating keys K11 and K12 are operated to make the inputs, the control circuit 47 in step ST610 performs the functions of the operating keys K11 and K12 after the definitions are assigned.

Thereafter, the processing circuit 33 detects only a fall of the portable type audio player 1, and does not detect the attitude of the portable type audio player 1 until the power supply to the portable type audio player 1 is changed from an off state to an on state next time.

The present invention is not limited to the foregoing embodiments.

That is, those skilled in the art may make various modifications, combinations, sub-combinations, and replacements of the components of the foregoing embodiments within the technical scope of the present invention or the scope of the equivalents thereof.

For example, while in the foregoing embodiments, a case is illustrated in which the present invention is applied to a portable type audio player, the present invention may be applied to other reproducing devices such as portable telephones, PDAs, game consoles, radio sets and the like, and reproduced data may be content data such as musical piece data, image data, moving image data and the like. The present invention is also applicable to devices that can reproduce data, have at least displaying means and operating means, and is convenient if changing a setting when the orientation of the device proper is varied.

While in the foregoing embodiments, a case is illustrated in which the acceleration sensor and the gravitational acceleration sensor 31 are used as attitude detecting means of the present invention, another constitution may be used in which a metallic ball comes in contact with a piezoelectric element corresponding to the attitude of the portable type audio player 1 among a plurality of piezoelectric elements, and the contact is detected electrically to detect the attitude of the portable type audio player 1.

While in the foregoing embodiments, a case is illustrated in which the functions of the operating keys K11, K12, K13, and K14 are changed by assigning definitions to the operating keys K11, K12, K13, and K14 of the cross key K1 as shown in FIG. 7A, FIG. 7B, and FIG. 7C according to a change of a screen displayed on the display 23, the functions of the SEARCH/MENU key K2, the stop key K3, the sound volume increasing key K4, and the sound volume decreasing key K5 may be changed.

According to the present invention, it is possible to control the orientation of an image according to the attitude of a reproducing device, and reduce power consumption as compared with the conventional device.

In addition, according to the present invention, it is possible to change the functions of operating keys by changing the definitions of the operating keys according to the attitude of a reproducing device. Therefore, when a user operates the operating keys in fixed directions with reference to the direction of gravitational acceleration at all times, the same functions can be performed at all times.

Further, according to the present invention, the attitude of a reproducing device is detected only under a predetermined condition, and then a setting of the reproducing device is changed according to the detected attitude of the reproducing device. Thus, since unnecessary changing of the setting is not performed, power consumption can be reduced as compared with the conventional device.

It should be understood by those skilled in the art that various modifications, combinations, sub-combinations and alterations may occur depending on design requirements and other factors insofar as they are within the scope of the appended claims or the equivalents thereof.

FIG. 1
1 (1a): PORTABLE TYPE AUDIO PLAYER
16: REPRODUCTION PROCESSING CIRCUIT
BUF: BUFFER MEMORY
17: AUDIO OUTPUT UNIT
18: HEADPHONE TERMINAL
19: HEADPHONES
21: DISPLAY MEMORY
23: DISPLAY
24: DISPLAY UNIT
31: ACCELERATION SENSOR AND GRAVITATIONAL ACCELERATION SENSOR
33: PROCESSING CIRCUIT (ATTITUDE DETECTION AND FALL DETECTION)
34: ATTITUDE DETECTING UNIT
35: FALL DETECTING UNIT
41: OPERATING KEYS
43: BATTERY
45: MEMORY
47 (47a): CONTROL CIRCUIT
48: POWER SUPPLY CIRCUIT
FIG. 2
K21: POWER SUPPLY KEY
23: DISPLAY
FIG. 4
k1: CROSS KEY
K3: STOP KEY
K4: SOUND VOLUME INCREASING KEY
K5: SOUND VOLUME DECREASING KEY
41: OPERATING KEYS

FIG. 5
5-1: DIRECTION OF GRAVITATIONAL ACCELERATION A_G
FIG. 7
7-1: OPERATING KEY
7-2: DEFINITION
7-3: MOVE UPWARD
7-4: MOVE TO HIGHER LEVEL
7-5: MOVE DOWNWARD
7-6: MOVE TO LOWER LEVEL
7-7: OPERATING KEY
7-8: DEFINITION
7-9: MOVE TO HIGHER LEVEL
7-10: MOVE DOWNWARD
7-11: MOVE TO LOWER LEVEL
7-12: MOVE UPWARD
7-13: OPERATING KEY
7-14: DEFINITION
7-15: MOVE TO LOWER LEVEL
7-16: MOVE UPWARD
7-17: MOVE TO HIGHER LEVEL
7-18: MOVE DOWNWARD
FIG. 8
8-1: START
8-2: END
ST11: IS POWER SUPPLY CIRCUIT TO BE CHANGED FROM OFF STATE TO ON STATE?
ST12: START ANIMATION DISPLAY
ST13: INITIAL SETTING OF ACCELERATION SENSOR AND GRAVITATIONAL ACCELERATION SENSOR
ST14: DETECT ATTITUDE OF PLAYER
ST15: HAS ATTITUDE OF PLAYER BEEN UNCHANGED FOR PREDETERMINED PERIOD?
ST16: DETERMINE ORIENTATION OF SCREEN DISPLAY CORRESPONDING TO ATTITUDE OF PLAYER
ST17: END ANIMATION DISPLAY
ST18: DISPLAY MENU SCREEN IN DETERMINED ORIENTATION
ST19: CHANGE DEFINITIONS OF OPERATING KEYS
FIG. 9
9-1: START
ST21: IS FALL DETECTED?
ST22: OUTPUT FALL DETECTION SIGNAL FROM PROCESSING CIRCUIT TO CONTROL CIRCUIT
ST23: CONTROL CIRCUIT RETRACTS HEAD
FIG. 10
10-1: START
10-2: END
ST31: IS POWER SUPPLY CIRCUIT TO BE CHANGED FROM OFF STATE TO ON STATE?
ST32: START ANIMATION DISPLAY
ST33: INITIAL SETTING OF ACCELERATION SENSOR AND GRAVITATIONAL ACCELERATION SENSOR
ST34: IS ATTITUDE OF PLAYER DETECTED?
ST35: DETERMINE ORIENTATION OF SCREEN DISPLAY CORRESPONDING TO ATTITUDE OF PLAYER
ST36: END ANIMATION DISPLAY
ST37: DISPLAY MENU SCREEN IN DETERMINED ORIENTATION
ST38: CHANGE DEFINITIONS OF OPERATING KEYS
ST39: DISPLAY MENU SCREEN IN ORIENTATION OF SCREEN DISPLAY AT TIME OF PREVIOUS ENDING
FIG. 11
11-1: START
11-2: END
ST41: DISPLAY MENU SCREEN
ST42: HAS PREDETERMINED PERIOD PASSED SINCE PREVIOUS INPUT?
ST43: START SCREEN SAVER DISPLAY
ST44: IS OPERATION PERFORMED?
ST45: INITIAL SETTING OF ACCELERATION SENSOR AND GRAVITATIONAL ACCELERATION SENSOR
ST46: DETECT ATTITUDE OF PLAYER
ST47: HAS ATTITUDE OF PLAYER BEEN UNCHANGED FOR PREDETERMINED PERIOD?
ST48: DETERMINE ORIENTATION OF SCREEN DISPLAY CORRESPONDING TO ATTITUDE OF PLAYER
ST49: END SCREEN SAVER DISPLAY
ST410: DISPLAY MENU SCREEN IN DETERMINED ORIENTATION
ST411: CHANGE DEFINITIONS OF OPERATING KEYS
FIG. 12
12-1: START
ST51: IS HOLD KEY RELEASED?
ST52: IS STATE CHANGED?
ST53: CHANGE ORIENTATION OF SCREEN
FIG. 13
13-1: START
13-2: END
ST61: IS INPUT BY OPERATING KEY MADE?
ST62: RETAIN INPUT BY OPERATING KEY
ST63: HAS PREDETERMINED PERIOD PASSED SINCE PREVIOUS INPUT?
ST64: INITIAL SETTING OF ACCELERATION SENSOR AND GRAVITATIONAL ACCELERATION SENSOR
ST65: DETECT ATTITUDE OF PLAYER
ST66: HAS ATTITUDE OF PLAYER BEEN UNCHANGED FOR PREDETERMINED PERIOD?
ST67: DETERMINE ORIENTATION OF SCREEN DISPLAY CORRESPONDING TO ATTITUDE OF PLAYER
ST68: DISPLAY MENU SCREEN IN DETERMINED ORIENTATION
ST69: CHANGE DEFINITIONS OF OPERATING KEYS
ST610: PERFORM FUNCTION OF OPERATING KEY BY WHICH INPUT WAS MADE

What is claimed is:

1. A reproducing device that produces data and operates on a battery, the reproducing device comprising:
a display component;
a determining component configured to determine whether a predetermined condition is satisfied;
an operating component configured to receive instructions from a user;
an attitude detector configured to detect an attitude of the reproducing device when the predetermined condition is satisfied, wherein the predetermined condition is satisfied when an operating instruction is received by the operating component; and
a controller configured to change a setting of the reproducing device based on the attitude,
wherein the setting is a display orientation of data displayed on the display component,
wherein the display orientation is associated with the attitude before the detecting,
wherein the display component displays a screen-saver screen,
wherein the predetermined condition is further satisfied when a change is made from a first state to a second state,
wherein the first state is when a screen saver is displayed on the display component, and
wherein the second state is when data displayed on the display component before the screen saver is displayed on the display component instead of the screen saver.

2. The reproducing device according to claim 1,
wherein the display component displays the data in the display orientation when the attitude is identical for a predetermined period.

3. The reproducing device according to claim 1, further comprising a power supplier for supplying power to the reproducing device,
wherein the predetermined condition is further satisfied when a power supply from the power supplier to the reproducing device is started.

4. The reproducing device according to claim 1,
wherein the operating component comprises a plurality of operating buttons including a hold key, and
wherein the operating instruction is received by the operating component when the hold key is released.

5. The reproducing device according to claim 1,
wherein the operating component comprises a plurality of operating buttons,
wherein the setting further comprises definitions assigned to the plurality of operating buttons, and
wherein the controller further changes functions of the plurality of operating buttons by changing the definitions assigned to the plurality of operating buttons.

6. The reproducing device according to claim 5,
wherein the functions of the plurality of operating buttons change when the attitude is identical for a predetermined period.

7. The reproducing device according to claim 5, further comprising a power supplier for supplying power to the reproducing device,
wherein the predetermined condition is further satisfied when a power supply from the power supplier to the reproducing device is started.

8. A method for changing a setting of a reproducing device operating on a battery, the method comprising:
determining whether a predetermined condition is satisfied;
detecting an attitude of the reproducing device when the predetermined condition is satisfied, wherein the predetermined condition is satisfied when an operating instruction is received by the reproducing device from a user; and
changing the setting of the reproducing device based on the attitude,
wherein the predetermined condition is further satisfied when a change is made from a first state to a second state,
wherein the first state is when a screen saver is displayed on a display screen, and
wherein the second state is when data displayed on the displaying screen before the screen saver is displayed on the displaying screen instead of the screen saver.

9. The method according to claim 8,
wherein the setting is a display orientation of data displayed on a display component of the reproducing device, and
wherein the display orientation is associated with the attitude before the detecting.

10. The method according to in claim 9, further comprising confirming that the attitude is identical for a predetermined period,
wherein changing the setting comprises changing the display orientation of the data displayed on the display component when the attitude is identical for the predetermined period.

11. The method according to claim 8,
wherein the predetermined condition is further satisfied when a power supply to the reproducing device is started.

12. The method according to claim 8,
wherein the operating instruction is received when a hold key is released by the user.

13. The method according to claim 8,
wherein changing the setting comprises changing functions of a plurality of operating buttons of the reproducing device by changing definitions assigned to the plurality of operating buttons.

* * * * *